US012695665B2

(12) United States Patent
Singh et al.

(10) Patent No.: US 12,695,665 B2
(45) Date of Patent: Jul. 28, 2026

(54) STORING NETWORK ADDRESS ASSIGNMENT RESPONSES FOR NETWORK DEVICE PROVISIONING

(71) Applicant: Arista Networks, Inc., Santa Clara, CA (US)

(72) Inventors: Anmolpreet Singh, Bengaluru (IN); Saurabh Singhal, Bengaluru (IN)

(73) Assignee: Arista Networks, Inc., Santa Clara, CA (US)

( * ) Notice: Subject to any disclaimer, the term of this patent is extended or adjusted under 35 U.S.C. 154(b) by 54 days.

(21) Appl. No.: 18/988,427

(22) Filed: Dec. 19, 2024

(65) Prior Publication Data

US 2026/0095373 A1    Apr. 2, 2026

(30) Foreign Application Priority Data

Oct. 2, 2024    (IN) .............................. 202441074501

(51) Int. Cl.
H04L 41/0806 (2022.01)
H04L 61/5007 (2022.01)

(52) U.S. Cl.
CPC ...... H04L 41/0806 (2013.01); H04L 61/5007 (2022.05)

(58) Field of Classification Search
CPC ........................ H04L 41/0806; H04L 61/5007
See application file for complete search history.

(56) References Cited

U.S. PATENT DOCUMENTS

| | | | |
|---|---|---|---|
| 2015/0237003 A1* | 8/2015 | Ghai ..................... | H04L 61/503 |
| | | | 709/220 |
| 2020/0084103 A1* | 3/2020 | Miller ................... | H04L 45/586 |
| 2024/0236036 A1* | 7/2024 | Goel ................... | H04L 61/5061 |
| 2025/0008328 A1* | 1/2025 | Smith ................ | H04L 41/5054 |
| 2025/0080492 A1* | 3/2025 | Fitzpatrick .......... | H04L 61/5014 |
| 2025/0126015 A1* | 4/2025 | Doyle ................ | H04L 41/0806 |
| 2025/0254087 A1* | 8/2025 | Gustaf ............... | H04L 67/1097 |

* cited by examiner

*Primary Examiner* — Benjamin M Thieu

(74) *Attorney, Agent, or Firm* — Treyz Law Group, P.C.; Tianyi He

(57) ABSTRACT

A network device may transmit network address assignment request messages on a plurality of network interfaces communicatively coupled to one or more network address assignment servers. The network device may store any network address assignment responses received from the one or more network address assignment servers within one or more response solicitation time periods and may attempt device provisioning based on the device provisioning priorities of the stored network address assignment responses.

20 Claims, 10 Drawing Sheets

SEND REQUEST MESSAGES (E.G., DIFFERENT TYPES OF REQUEST MESSAGES IN DIFFERENT BATCHES) ON NETWORK INTERFACES — 60

RECEIVE RESPONSE MESSAGES (E.G., DIFFERENT TYPES OF RESPONSE MESSAGES IN DIFFERENT BATCHES) ON THE NETWORK INTERFACES — 62

STORE THE RESPONSE MESSAGES (E.G., RECEIVED WITHIN ONE OR MORE TIME PERIODS) — 64

66 — PERFORM DEVICE PROVISIONING BASED ON A GIVEN ONE OF THE STORED RESPONSE MESSAGES (E.G., SELECTED BASED ON PRIORITY) — 68

IF DEVICE PROVISIONING UNSUCCESSFUL

STORING NETWORK ADDRESS ASSIGNMENT RESPONSES FOR NETWORK DEVICE PROVISIONING

This application claims the benefit of Indian provisional patent application No. 202441074501, filed on Oct. 2, 2024, which is hereby incorporated by reference herein in its entirety.

BACKGROUND

This relates to network devices, and more particularly, to network devices configured to communicate with a network address assignment server.

In one illustrative system, a network device may be an initially un-provisioned network device configured to perform a self-provisioning operation by communicating with the network address assignment server.

DETAILED DESCRIPTION

Figure 1:
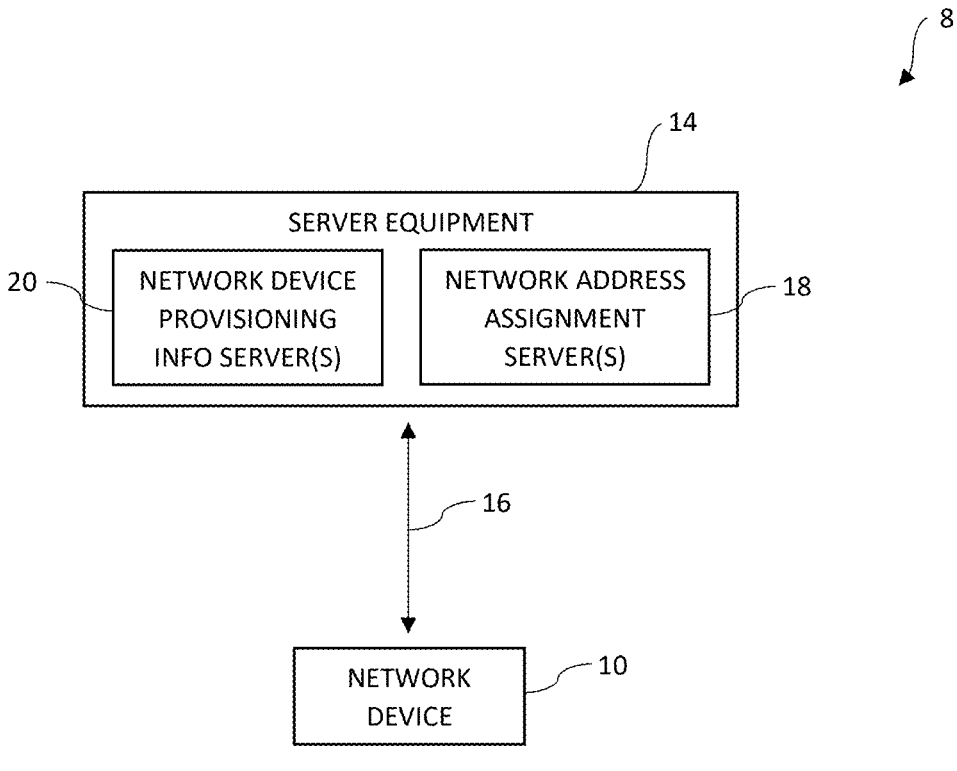
FIG. 1 is a diagram of an illustrative networking system in which a network device is configured to communicate with network address assignment server(s) in accordance with some embodiments.

A network can convey network traffic (e.g., in the form of packets, frames, etc.) between hosts or generally between devices in the network. To properly route and forward the network traffic, the network can include a number of network devices that maintain device configuration data such as forwarding decision data, routing decision data, network policy information, etc. Network devices typically require provisioning and the reception of device configuration data to be operational within the network. To simplify the process of provisioning or configuring a network device for operation, the network device may initiate its own provisioning operation (sometimes referred to as a self-provisioning operation).

As part of the provisioning operation and/or as part of other network device operations, the network device may request and obtain information, such as an identifier (e.g., a locator or address) for network device provisioning information, in a response from a network address assignment server (e.g., a server implementing DHCP (Dynamic Host Configuration Protocol) such as DHCPv4 (Dynamic Host Configuration Protocol version 4), stateful DHCPv6 (Dynamic Host Configuration Protocol version 6), and/or stateless DHCPv6). The network device may further use the obtained information to perform the self-provisioning operation (e.g., use the obtained identifier to access the network device provisioning information).

In illustrative configurations sometimes described herein as an example, multiple network address assignment servers on different networks (e.g., on different Local Area Networks (LANs), on different Wide Area Networks (WANs), etc.) may be accessible by the network device via corresponding network interfaces of the network device. Responsive to receiving a first network address assignment response from a given one of the multiple network address assignment servers, the network device may stop processing of any additional received network address assignment response(s) (e.g., from other network address assignment servers) and attempt to provision itself based on information in the first-received response. Accordingly, the first-received response may essentially control the provisioning operation of the network device.

However, this manner of performing device provisioning may be susceptible to issues when the information in the first-received response fails to facilitate successful provisioning of the network device. As an example, after the failure on this initial attempt, the network device may again request additional network address assignment responses from network address assignment servers. Even on subsequent attempts, the network device may repeatedly receive the same response that will cause provisioning of the network device to fail, thereby stalling efforts by the network device to complete its self-provisioning operation and perform normal networking operations thereafter.

To mitigate these types of issues and generally provide a more robust manner of performing network device provisioning, and/or to impart other advantages, the network device may be configured to store any (e.g., multiple) network address assignment response(s) (e.g., received during one or more response solicitation time periods) and may perform device provisioning based on processing corresponding information contained in the stored response(s) of the highest priority response type, until processing of information in one of the responses leads to successful device provisioning. When the network device is configured in this manner, provisioning can be attempted using all of the received responses of the highest priority response type, thereby ensuring that even a later-received response of the highest priority response type has an opportunity to facilitate successful device provisioning. Additionally, by storing all of the received responses based on an initial set of requests, the network device may not need to perform multiple sequential sets of requests to receive and process the same set of responses (because in the prior example only one response is received and processed based on each set of requests).

An illustrative networking system in which a network device is configured to communicate with one or more network address assignment servers is shown in FIG. 1. In particular, FIG. 1 shows an illustrative network 8 which may be of any suitable scope and/or form part of a larger network of any suitable scope. As examples, network 8 may include, be, and/or form part of one or more local segments, one or more local subnets, one or more local area networks (LANs), one or more campus area networks, one or more metropolitan area networks, one or more wide area networks, one or more datacenter networks, one or more cloud networks, etc. Network 8 may include any suitable number of different network devices that connect corresponding host devices of network 8 to one another. At least some of these network devices may be connected by one or more wired technologies or standards such as Ethernet (e.g., using electrical cables and/or fiber optic cables), thereby forming a wired network portion. If desired, network 8 may also include a wireless network portion coupled to the wired network portion. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

In general, network devices in network 8 can include any number of switches (e.g., single-layer (Layer 2) switches and/or multi-layer (Layer 2 and Layer 3) switches), bridges, routers, gateways, hubs, repeaters, firewalls, wireless access points, network devices serving other networking functions, network devices that include the functionality of two or more of these devices, management devices that control the operation of one or more of these network devices, and/or other types of network devices.

In the example of FIG. 1, the network devices of network 8 include at least network device 10, such as a multi-layer switch or another type of network device (as described above). Network 8 may also include one or more host devices or host equipment such as server equipment 14. Configurations in which network device 10 is an un-provisioned network device (e.g., not a fully provisioned network device) when initially coupled or connected to other elements of network 8 are sometimes described herein as an illustrative example.

In these configurations, network device 10 may communicate with different portions of server equipment 14 via one or more communication paths 16 in an attempt to perform a network device provisioning operation that provisions and configures device 10 itself for operation. In particular, network device 10 may communicate with a network address assignment server 18 implemented on server equipment 14 (e.g., a DHCP server such as server equipment 14 implementing DHCPv4, implementing (stateful or stateless) DHCPv6, implementing a variation of DHCP, implementing a server that is compliant with only some portions of DHCP, and/or implementing other network address assignment protocols) to obtain a network address, or generally device network configuration information, for network device 10. Additionally, the network address assignment server 18 may provide network device 10 with an identifier (e.g., a locator, an address, etc.) for obtaining device provisioning information. Depending on the configuration of server 18, the identifier and/or other information indicative of remote device provisioning information may differ. As an example, the identifier may identify a given network device provisioning information server 20 (e.g., a bootstrap server, a file server, etc.) and/or may identify a file location on server 20 for obtaining device provisioning information (e.g., a script executable by device 10 for performing self-provisioning).

After obtaining its network address from server 18, network device 10 may configure one or more network interfaces (e.g., the same interface on which device 10 communicated with server 18 and/or any other applicable interfaces on the same network) using the obtained network address and/or the obtained device configuration information. Using the configured network interface(s), the network device may access the network device provisioning information server 20 (identified based on communication with server 18) to obtain network device provisioning information stored thereon (or identified to be elsewhere by server 20). The network device provisioning information may include executable file(s) (e.g., a boot file script, a pre-configuration script, a post-configuration script, etc.), device configuration data (e.g., device onboarding information for facilitating device networking functions such as a startup configuration, operating system version and/or state information, etc.), and/or other bootstrapping data (e.g., certificates and/or other security information, redirect information, etc.).

In general, there may be any number of servers 18 (as described above) provided across various parts of network 8 (e.g., in different network portions of network 8). One or more of these servers 18 may be communicatively coupled to network device 10 and may facilitate the operations described above.

Network device 10 may be considered fully provisioned and ready to perform networking operations (e.g., routing protocols, traffic routing, traffic forwarding, etc.) after successfully executing the obtained executable file(s), storing the obtained device configuration data, otherwise processing the provisioning information, and/or rebooting device 10, as examples.

While both shown in FIG. 1 to be within server equipment 14, servers 18 and 20 may be implemented on distinct and separate pieces of server computing equipment on different instances of equipment 14 (e.g., on different processing circuitry or sets of processors, using different storage circuitry accessible by the corresponding processing circuitry, on the same or different server racks, on different server host equipment, etc.), or may be implemented on shared computing equipment on the same instance of server equipment 14 (e.g., the same processing circuitry or set of processors, using the same storage circuitry accessible by the processing circuitry, etc.). Servers 18 and 20 may be implemented at different sites or generally on different network portions of network 8 (e.g., on different local segments or local area networks, on different wide area networks, etc.), or may be implemented at the same site (e.g., on the same local segment or local area network, or on different local segments or local area networks).

Communication paths 16 communicatively coupling network device 10 to servers 18 and 20 may be implemented using network paths of network 8. These network paths may include direct cable connections with or without intervening network devices. In other words, each path 16 may span across portions of network 8 (e.g., one or more network devices therein) to provide the connectivity illustrated in FIG. 1. While shown in FIG. 1 as a single arrow, multiple (different) paths may communicatively couple network device 10 to server 18 and/or server 20.

In one illustrative arrangement, network device 10 may lack a direct connection to server 18 and any connection between network device 10 and server 18 may include a router serving as a relay device. In particular, the router may contain a relay agent executing on its processing circuitry to perform relaying of address assignment request and response messages (e.g., DHCP messages) for network device 10 and server 18. This relaying of address assignment request and response messages and/or other types of messages occurs prior to device 10 having or being assigned a network address and thus will differ from normal packet forwarding (e.g., forwarding of packets that identify the network address of device 10). If desired, other routers and/or network devices may also serve as relay devices to relay these messages and/or other messages between device 10 and server 18.

Figure 2:
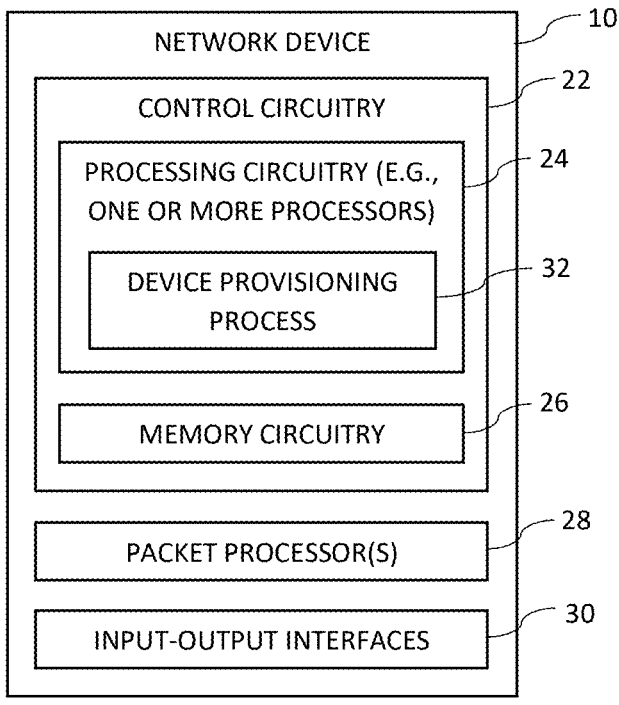
FIG. 2 is a diagram of an illustrative network device in accordance with some embodiments.

FIG. 2 is a diagram of an illustrative network device such as network device 10 in FIG. 1. In some configurations described herein as an illustrative example, network device 10 may be an un-provisioned multi-layer switch or other type of network device that automatically initiates a device provisioning operation to provision itself after being introduced to network 8 in FIG. 1 (e.g., after being communicatively coupled to components of network 8 such as a router and/or server equipment 14).

As shown in FIG. 2, network device 10 may include control circuitry 22 having processing circuitry 24 and memory circuitry 26, one or more packet processors 28, and input-output interfaces 30 provided within or on a housing of network device 10. As examples, the housing may include an exterior cover and/or a supporting substrate that provides protection and/or structural support for the components of network device 10 mounted within and/or on the housing. In one illustrative arrangement, network device 10 may be or form part of a modular network device system (e.g., a modular switch system having removably coupled modules usable to flexibly expand characteristics and capabilities of the modular switch system such as to increase the number of ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 24 may include one or more processors such as central processing units (CPUs), graphics processing units (GPUs), microprocessors, general-purpose processors, host processors, coprocessors, microcontrollers, digital signal processors, programmable logic devices such as field programmable gate array (FPGA) devices, application specific system processors (ASSPs), application specific integrated circuit (ASIC) processors, and/or other types of processors.

Processing circuitry 24 may run (e.g., execute) a network device operating system and/or other software (including firmware) that is stored on memory circuitry 26. Memory circuitry 26 may include one or more non-transitory (tangible) computer-readable storage media that store the operating system software and/or any other software code, sometimes referred to as program instructions, software instructions, software, data, instructions, or code. As an example, the transmission, reception, and/or processing of communication with device network address assignment server(s) 18 and provisioning information server(s) 20 as described herein may be stored as (software) instructions on the one or more non-transitory computer-readable storage media (e.g., in portion(s) of memory circuitry 26). The corresponding processing circuitry (e.g., one or more processors of processing circuitry 24) may process or execute the respective instructions to perform the transmission, reception, and/or processing of communication with device network address assignment server(s) 18 and provisioning information server(s) 20. Accordingly, processing circuitry 24 may be configured to perform these operations described herein.

Memory circuitry 26 may include non-volatile memory (e.g., flash memory, electrically-programmable read-only memory, a solid-state drive, hard disk drive storage, etc.), volatile memory (e.g., static or dynamic random-access memory), removable storage devices (e.g., storage devices removably coupled to device 10), and/or other types of memory circuitry. Processing circuitry 24 and memory circuitry 26 as described above may sometimes be referred to collectively as control circuitry 22 (e.g., implementing a control plane of network device 10).

As other illustrative operations in addition to operations performed in connection with communication with device network address assignment server(s) 18 and provisioning information server(s) 20 (e.g., as part of a device provisioning operation), processing circuitry 24 may execute network device control plane software such as operating system software, routing policy management software, routing protocol agents or processes, routing information base agents, and other control software, may be used to support the operation of protocol clients and/or servers (e.g., to form some or all of a communications protocol stack), may be used to support the operation of packet processor(s) 28, may store packet forwarding information, may execute packet processing software, and/or may execute other software instructions that control the functions of network device 10 and the other components therein. Some of these operations such as those associated with routing policy management software, routing protocol agents or processes, routing information base agents, and packet processing software may occur after the device provisioning operation has successfully completed.

Packet processor(s) 28 may be used to implement a data plane or forwarding plane of network device 10. Packet processor(s) 28 may include one or more processors such as application specific integrated circuit (ASIC) processors, programmable logic devices such as field programmable gate array (FPGA) devices, application specific system processors (ASSPs), central processing units (CPUs), graphics processing units (GPUs), microprocessors, general-purpose processors, host processors, coprocessors, microcontrollers, digital signal processors, and/or other types of processors.

Packet processor 28 may receive incoming network traffic via input-output interfaces 30 (and/or other network traffic via internal interfaces), parse and analyze the network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on memory circuitry integrated as part of and/or separate from packet processor 28 (e.g., on content-addressable memory), and/or on a portion of memory circuitry 26. Memory circuitry for packet processor 28 may similarly include volatile memory and/or non-volatile memory.

Input-output interfaces 30 (sometimes referred to herein as network interfaces) may include one or more different types of communication interfaces such as Ethernet interfaces, optical interfaces, network layer (e.g., Internet Protocol (IP) such as IPv4 and/or IPv6) interfaces, wireless interfaces such as Bluetooth interfaces and Wi-Fi interfaces, and/or other communication interfaces for connecting network device 10 to the Internet, local area networks, wide area networks, mobile networks, and/or generally other network device(s), peripheral devices, and computing equipment (e.g., host equipment such as server equipment 14, client devices, etc.). In some illustrative configurations described herein as an example, input-output interfaces 30 may include Ethernet interfaces implemented using and therefore include (Ethernet) ports. In particular, data link layer (L2) and/or physical layer (L1) interface circuitry may be coupled to the ports to form Ethernet interfaces with the desired interface configuration. Processing circuitry 24 may further form (e.g., configure) network layer (e.g., IPv4 and/or IPv6) interfaces (e.g., coupled to the data link layer and/or physical layer interface circuitry) and implemented over the Ethernet interfaces. The network layer interfaces may therefore also form part of network interfaces 30. The ports may be physically coupled and electrically connected to corresponding mating connectors of external equipment, when received at the ports, and may have different form-factors to accommodate different cables, different modules, different devices, or generally different external equipment.

Device 10 may include any suitable number of other components such as power management circuitry, thermal management components (e.g., heatsinks, fans, etc.), etc. In general, the components of device 10 may be communicatively coupled to each other or at least to control circuitry 22 (e.g., processing circuitry 24 and/or memory circuitry 26) via corresponding signal paths. These signal paths may be configured to convey power (e.g., supply voltage(s)), control signals, data, and/or other information between the inter-coupled components of device 10.

In configurations in which network device 10 is an initially un-provisioned network device, processing circuitry 24 on network device 10 may execute a device provisioning process 32 (sometimes referred to herein as a device provisioning agent or an instance thereof) that helps manage and facilitate the device self-provisioning operation described herein after the initially un-provisioned device 10 is supplied with power and is communicatively coupled to component(s) of network 8 (e.g., by having a network connection). If desired, this provisioning operation may be initiated automatically by executing agent 32 based on one or more criteria being met. The one or more criteria may include network device 10 being connected to a power source, network device 10 being coupled to one or more components of network 8, network device 10 lacking an initial configuration, network device 10 receiving one or more user inputs such as the pressing of a button, the providing of a key or other security element, or generally any specified input via a user interface, and/or other suitable provisioning criteria. Configured in this manner, network device 10 may sometimes be referred to herein as a network device configured for secure zero touch provisioning, zero touch provisioning, one touch provisioning, or minimal touch provisioning.

As part of the device provisioning operation, device 10 (e.g., processing circuitry 24 when executing device provisioning process 32) may obtain device network configuration information such as the network (e.g., IP) address of network device 10 from a network address assignment server 18. Processing circuitry 24 (e.g., when executing process 32) may use the obtained device network configuration information to form one or more network interfaces 30 (e.g., one or more IPv4 or IPv6 interfaces) for device 10. Processing circuitry 24 (e.g., when executing process 32) may further obtain an indication of network device provisioning information (e.g., identifier(s) of server 20 and/or of provision information stored thereon) from the network address assignment server 18. Processing circuitry 24 (e.g., when executing process 32) may subsequently communicate with server 20 (e.g., using the one or more IPv4 or IPv6 interfaces) to obtain provisioning information, such as executable files, device configuration data, and/or generally other types of bootstrapping data, which, when processed successfully, completes the device provisioning operation.

Processing circuitry 24 may execute device provisioning agent 32 by executing software instructions stored on memory circuitry 26 (e.g., one or more non-transitory computer-readable storage media). While device provisioning agent 32 is sometimes described to perform respective parts of the device provisioning operation for provisioning device 10, this is merely illustrative. Processing circuitry 24 may be implemented, organized, and/or configured in any suitable manner (e.g., to execute any other agents or processes instead of or in addition to device provisioning agent 32) to perform each part of the device provisioning operation. Accordingly, processing circuitry 24 may sometimes be described herein to perform the device provisioning operation instead of specifically referring to the one or more agents, processes, and/or kernel executed by processing circuitry 24.

In certain configurations of network 8, multiple network address assignment servers 18 on multiple network portions of network 8 may be accessible by network device 10 via corresponding network interfaces 30 of network device 10. In particular, FIG. 3 is a diagram of an illustrative network configuration in which network device 10 is communicatively coupled to multiple network address assignment servers 18 (e.g., servers 18-1, 18-2, 18-3, etc.).

Figure 3:
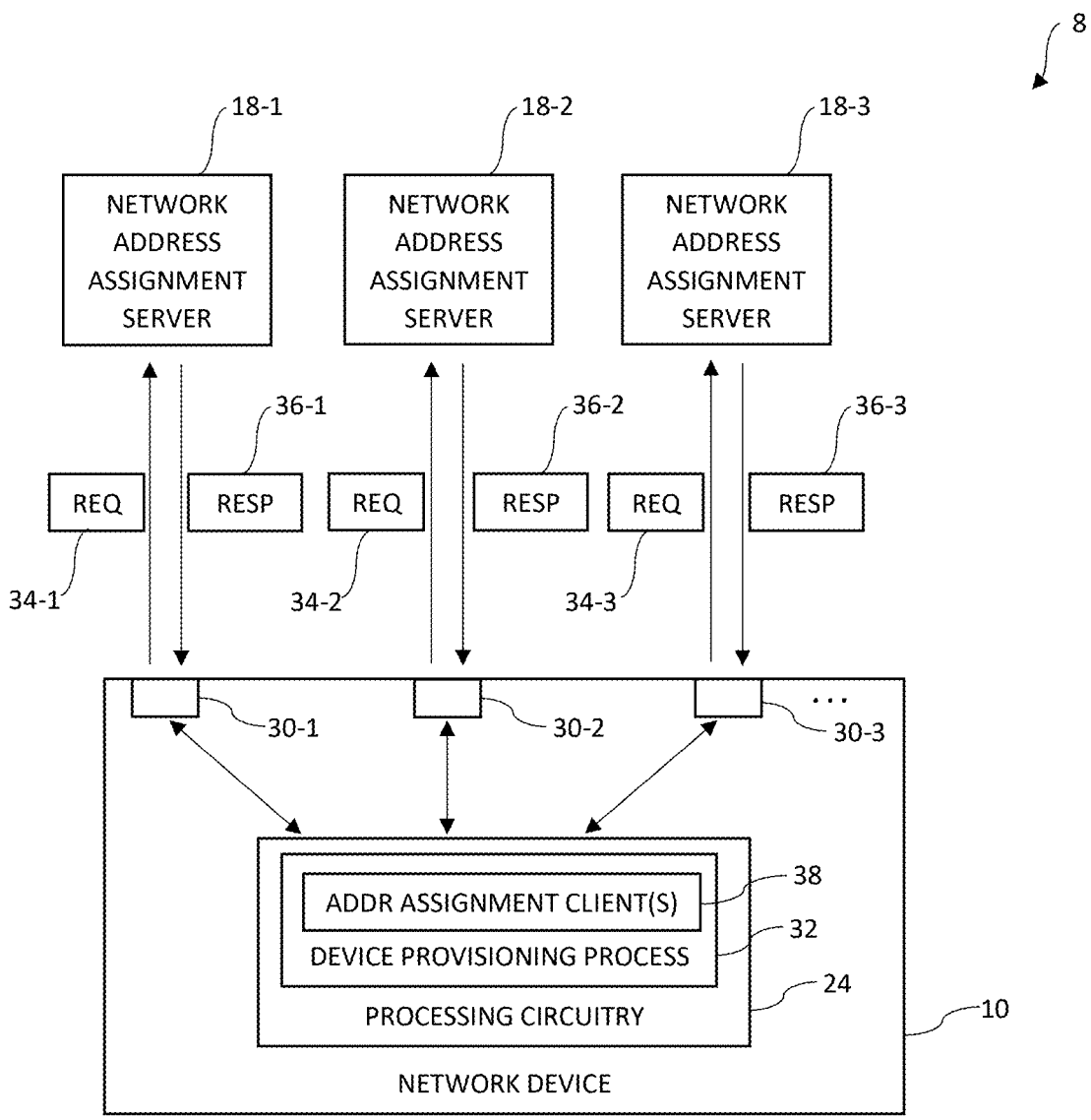
FIG. 3 is a diagram of an illustrative network device configured to receive network address assignment responses from multiple network address assignment servers in accordance with some embodiments.

In the example of FIG. 3, network device 10 may include any (N) number of network interfaces 30-1, 30-2, 30-3, . . . 30-N (e.g., N instances of interfaces 30 in FIG. 2). Processing circuitry 24 of network device 10, when executing process 32 to perform the device provisioning operation, may initialize one or more instances of network address assignment clients 38 each configured to transmit (e.g., broadcast) network address assignment messages to network address assignment servers 18 in a different manner (e.g., using different protocols, requesting different information, etc.). As examples, instances of clients 38 may implement instances of a DHCPv4 client, a stateful DHCPv6 client, and/or a stateless DHCPv6 client. When executing each client instance 38, processing circuitry 24 may generate a corresponding network address assignment request 34 (e.g., a DHCPv4 request, a stateful DHCPv6 request, and/or a stateless DHCPv6 request) to be transmitted on all network interfaces 30-1, 30-2, 30-3, . . . 30-N and may receive, on the same request-transmitting interface 30, any network address assignment responses 36 (e.g., a DHCPv4 response, a stateful DHCPv6 response, and/or a stateless DHCPv6 response) responsive to the corresponding request(s) 34.

In some illustrative configurations described herein, processing circuitry 24 (e.g., executing process 32) may initialize different types of clients 38 at different times. As one illustrative example, processing circuitry 24 may first initialize stateful network address assignment clients 38 (e.g., DHCPv4 client instance 38 and/or stateful DHCPv6 client instance 38) that are configured to transmit stateful address assignment requests 34 (e.g., DHCPv4 requests and/or stateful DHCPv6 requests) on multiple, if not all, enabled interfaces 30. These stateful requests 34 may solicit address assignment responses 36 (e.g., DHCPv4 responses and/or stateful DHCPv6 responses) that contain the network address (e.g., IPv4 or IPv6 address) and other device network configuration information for device 10. In particular, processing circuitry 24 may set a timer with an allotted time (e.g., 5 seconds, 10 seconds, 15 seconds, 20 seconds, a time between 5 and 30 seconds, etc.) for receiving any network address assignment responses 36 to these stateful requests 34 (e.g., on any of the request-transmitting interfaces 30). In other words, the timer may define a (stateful) response solicitation time period within which responses 36 to these stateful requests 34 are expected to be received and/or will be processed by processing circuitry 24.

Following the initialization of stateful clients 38, processing circuitry 24 may initialize stateless network address assignment client(s) 38 (e.g., stateless DHCPv6 instance 38) that are configured to transmit stateless address assignment requests 34 (e.g., stateless DHCPv6 requests) on multiple, if not all, enabled interfaces 30. These stateless requests 34 may solicit address assignment responses 36 (e.g., stateless DHCPv6 responses) that lack the network address for network device 10. In this stateless scenario, prior to communicating with address assignment server(s) 18, device 10 may have already received information such as a network prefix (e.g., using an exchange of router solicitation and router advertisement messages with a local router), which in combination with a device identifier or other identifier information, can be used to obtain (e.g., locally generate) a network address (e.g., an IPv6 address) for device 10 (e.g., using stateless address auto-configuration). The stateless responses 36 may provide other device network configuration information, such as DNS server IP addresses, domain name information, etc. For stateless requests 34, processing circuitry 24 may also set a timer with an allotted time (e.g., 5 seconds, 10 seconds, 15 seconds, 20 seconds, a time between 5 and 30 seconds, etc.) for receiving any network address assignment responses 36 to these stateless requests 34 (e.g., on any of the request-transmitting interfaces 30). In other words, the timer may define a (stateless) response solicitation time period within which responses 36 to these stateless requests 34 are expected to be received and/or will be processed by processing circuitry 24.

In the example of FIG. 3, network interface 30-1 may be communicatively coupled to and facilitate communication to and from a first network portion of network 8 (e.g., a first local area network, a first wide area network, or another type of network) that includes network address assignment server 18-1, network interface 30-2 may be communicatively coupled to and facilitate communication to and from a second network portion of network 8 (e.g., a second local area network, a second wide area network, or another type of network) that includes network address assignment server 18-2, and network interface 30-3 may be communicatively coupled to and facilitate communication to and from a third network portion of network 8 (e.g., a third local area network, a third wide area network, or another type of network) that includes network address assignment server 18-3.

This example is merely illustrative. There may be any suitable number of interfaces 30, some of which may be communicatively coupled to an address assignment server 18 and some of which may not be communicatively coupled to an address assignment server 18. Network address assignment servers 18 may each be configured to respond to one or more types of address assignment requests 34, depending on the server configuration. As examples, each server 18 (e.g., each of servers 18-1, 18-2, and 18-3) may be configured to respond to a DHCPv4 request 34 with a DHCPv4 response message 36 (if a DHCPv4 service is provided thereon), may be configured to respond to a stateful DHCPv6 request 34 with a stateful DHCPv6 response message 36 (if a stateful DHCPv6 service is provided thereon), and/or may be configured to respond to a stateless DHCPv6 request 34 with a stateless DHCPv6 response message 36 (if a stateless DHCPv6 service is provided thereon).

In one illustrative scenario, processing circuitry 24 may transmit a request (message) 34-1 (e.g., a DHCPv4 request message, a stateful DHCPv6 request message, or a stateless DHCPv6 request message) on interface 30-1 (and also on other interfaces 30) and may first receive a corresponding response (message) 36-1 (e.g., a DHCPv4 response message, a stateful DHCPv6 response message, or a stateless DHCPv6 response message) from server 18-1, responsive to corresponding request message 34-1 transmitted by processing circuitry 24 on interface 30-1. Processing circuitry 24 may only subsequently receive, on corresponding interfaces 30-2 and 30-3, response messages 36-2 and 36-3 (e.g., each being a DHCPv4 response message, a stateful DHCPv6 response message, or a stateless DHCPv6 response message) from servers 18-2 and 18-3, respectively, responsive to corresponding request messages 34-2 and 34-3 transmitted by processing circuitry 24 on corresponding interfaces 30-2 and 30-3 (and also on other interfaces 30). Request messages 34-1, 34-2, and 34-3 may be sent by the same and/or different client instance(s) 38.

If network device 10 is configured to always process a first-received response, e.g., response 36-1 in this example, issues may arise if response 36-1 does not facilitate successful device provisioning but is always the first-received response (even on subsequent solicitations for network address assignment responses). These issues may cause device 10 not to be successfully provisioned even if one of the other responses (e.g., response 36-2 or 36-3) can facilitate successful device provisioning, as the other responses may be discarded because they are not (e.g., never) received first.

To avoid these types of issues and provide a more robust scheme for device provisioning in various network deployments, network device 10 may be configured to store any network address assignment response messages 36 (e.g., DHCPv4 response message(s), stateful DHCPv6 response message(s), and stateless DHCPv6 response message(s)) received within corresponding allocated time period(s) in response to the transmission of an initial set of network address assignment request messages 34 (e.g., a DHCPv4 request message, a stateful DHCPv6 response message, and a stateless DHCPv6 request message sent on all enabled interfaces 30). Configured in this manner, network device 10 may iterate through and process a desired set of the stored received response messages 36, e.g., a set of messages 36 of a highest priority response type. Accordingly, this may ensure that any received response message 36 in this desired set of responses 36 will be used to attempt provisioning of device 10 and that a response message 36 in this desired set of responses 36 will be processed in due time to successfully provision device 10, if such a response message 36 exists (regardless of when this message 36 is received relative to the other received messages 36).

Still referring to FIG. 3, upon receiving responses 36-1, 36-2, and 36-3 (and any other responses 36 from the same or different server(s) 18) at corresponding interfaces 30 within the corresponding allotted time period(s) (e.g., a stateful response solicitation time period for any stateful responses 36-1, 36-2, and 36-3 and/or a stateless response solicitation time period for any stateless responses 36-1, 36-2, and 36-3), processing circuitry 24 may store received responses 36-1, 36-2, and 36-3 (and any of the other responses 36) in memory circuitry 26 (FIG. 2) of device 10. At the end of the total allotted time period for receiving any responses (e.g., at the end of the sequential stateful and stateless response solicitation time periods for receiving any responses), processing circuitry 24 (e.g., when executing process 32) may begin attempting device provisioning, by processing information in the stored responses 36 one at a time (e.g., in any desired order), until device provisioning has successfully been completed based on processing information in one of the stored responses 36.

Responses 36 may be associated with different device provisioning priorities (e.g., indicative of processing preference of that response 36 relative to other responses 36 when attempting device provisioning). As an example, a first set of response(s) 36 may have a higher (device provisioning) priority than a second set of response(s) 36. Accordingly, in this example, performing device provisioning based on processing the first set of response(s) 36 may be preferred over performing device provisioning based on processing the second set of response(s) 36.

Figure 4:
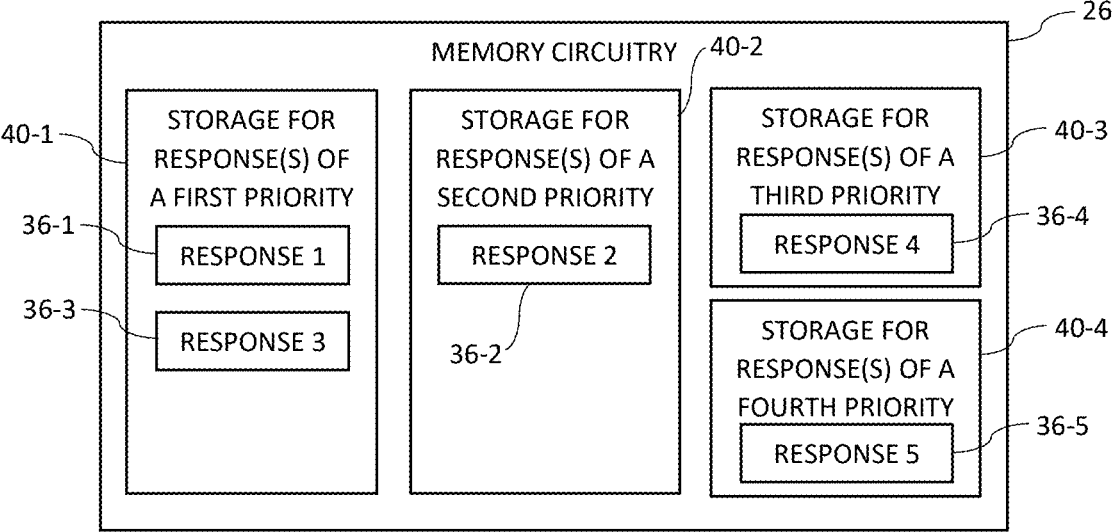
FIG. 4 is a diagram of illustrative network device memory circuitry configured to store multiple network address assignment responses in accordance with some embodiments.

In some configurations described herein as an example, processing circuitry 24 may be configured to select and process a set of one or more response(s) 36 of a preferred response type (e.g., having a highest priority response type) out of all stored responses 36, and may be configured to iterate through the set of stored response(s) 36 of the preferred response type (e.g., process responses 36 in the set, one at a time) to attempt device provisioning. To facilitate this type of selection and processing of responses 36, processing circuitry 24 may store all received responses 36 in memory circuitry 26 based on the content of each response 36. FIG. 4 is a diagram of illustrative memory circuitry 26 that stores different types of responses 36 based on the priority indicated by the content therein.

In particular, memory circuitry 26 may include a first memory portion 40-1 (e.g., first data storage circuitry, a first buffer, etc.) that stores received responses 36 associated with a first priority (or generally a first type of responses 36), may include a second memory portion 40-2 (e.g., second data storage circuitry, a second buffer, etc.) that stores received responses 36 associated with a second priority (or generally a second type of responses 36), may include a third memory portion 40-3 (e.g., third data storage circuitry, a third buffer, etc.) that stores received responses 36 associated with a third priority (or generally a third type of responses 36), may include a fourth memory portion 40-4 (e.g., fourth data storage circuitry, a fourth buffer, etc.) that stores received responses 36 associated with a fourth priority (or generally a fourth type of responses 36), etc.

Accordingly, processing circuitry 24 (e.g., when executing process 32) may attempt device provisioning based on one or more responses 36 stored in memory portion 40-1. If no received responses 36 are stored in memory portion 40-1, processing circuitry 24 may attempt device provisioning based on one or more responses 36 stored in memory portion 40-2. If no received responses 36 are stored in memory portions 40-1 and 40-2, processing circuitry 24 may attempt device provisioning based on one or more responses 36 stored in memory portion 40-3. If no received responses 36 are stored in memory portions 40-1, 40-2, and 40-3, processing circuitry 24 may attempt device provisioning based on one or more responses 36 stored in memory portion 40-4, and so on.

As a continuation of the example described in connection with FIG. 3, processing circuitry 24 may first receive response 36-1 from server 18-1 using interface 30-1 in response to a request 34-1 sent using interface 30-1, may determine that response 36-1 and the content therein are associated with a first (device provisioning) priority, and may store response 36-1 in memory portion 40-1 in FIG. 4. Processing circuitry 24 may then receive response 36-2 from server 18-2 using interface 30-2 in response to a request 34-2 sent using interface 30-2, may determine that response 36-2 and the content therein are associated with a second (device provisioning) priority, and may store response 36-2 in memory portion 40-2 in FIG. 4. Thereafter, processing circuitry 24 may receive response 36-3 from server 18-3 using interface 30-3 in response to a request 34-3 sent using interface 30-3, may determine that response 36-3 and the content therein are associated with the first (device provisioning) priority, and may store response 36-3 in memory portion 40-1 in FIG. 4.

Accordingly, processing circuitry 24 may attempt device provisioning using responses 36-1 and 36-3 associated with the first (highest) device provisioning priority. In illustrative configurations described herein as an example, processing circuitry 24 may attempt device provisioning using response 36-1 prior to attempting device provisioning using response 36-3 based on an order of response reception by device 10 (e.g., when responses 36 have the same priority). As an example, response 36-1 may be a stateful network address assignment response for which solicitation occurs prior to the solicitation for response 36-3 which may be a stateless network address assignment response (e.g., based on the example described in connection with FIG. 3 in which stateful address assignment client instances 38 are initiated prior to stateless address assignment client instance 38). If desired, other orders based on other criteria may be used to determine an order of processing responses with the same device provisioning priority.

In some illustrative configurations described herein as an example, processing circuitry 24 may attempt device provisioning only using the set of responses having the highest priority (e.g., responses 36-1 and 36-3 stored in memory portion 40-1) and may not attempt device provisioning using any of the other responses having lesser priorities (e.g., responses 36 stored in memory portions 40-2, 40-3, and 40-4). In other words, regardless of whether or not processing circuitry 24 successfully completes device provisioning based on responses 36-1 and/or 36-3, processing circuitry 24 may discard and not perform device provisioning using response 36-2. This may help improve device provisioning security and/or preserve desired deployment-specific device provisioning characteristics, as the existence of response(s) of the highest priority may be indicative of the preferred (e.g., the only satisfactory, the most secure, etc.) manner of device provisioning while any other responses may provide suboptimal device provisioning.

If desired, in other scenarios, processing circuitry 24 may attempt device provisioning using responses having multiple device provisioning priorities. As an example in connection with FIGS. 3 and 4, after failing to provision device 10 based on responses 36-1 and 36-3, processing circuitry 24 may attempt device provisioning using response 36-2.

While three address assignment responses 36-1, 36-2, and 36-3 are described above in connection with FIGS. 3 and 4, this is merely illustrative. In analogous manner, processing circuitry 24 may receive response 36-4 from a server 18 using an interface 30 in response to a corresponding request 34 sent using the same interface 30, may determine that response 36-4 and the content therein are associated with the third (device provisioning) priority, and may store response 36-4 in memory portion 40-3 in FIG. 4. Processing circuitry 24 may receive response 36-5 from a server 18 using an interface 30 in response to a corresponding request 34 sent using the same interface 30, may determine that response 36-5 and the content therein are associated with the fourth (device provisioning) priority, and may store response 36-5 in memory portion 40-4 in FIG. 4.

In general, depending on the network deployment, a variety of address assignment responses 36 may be received when a set of address assignment requests (e.g., a DHCPv4 request and a stateful DHCPv6 request associated with a first response solicitation time period, and subsequently a stateless DHCPv6 request associated with a second response solicitation time period) are transmitted on all enabled interfaces 30. Any number of received response(s) 36 (e.g., zero, one, two, three, etc.) may be stored in each of memory portions 40-1, 40-2, 40-3, 40-4, etc.

The device provisioning priority associated with a given received network address assignment response 36 may be indicated by the type of network device provisioning and/or the identifier of network device provisioning information contained in response 36, among other information. Illustrative types of information contained within network address assignment responses 36 (sometimes referred to as network address assignment response messages 36) are shown in FIG. 5.

Figure 5:
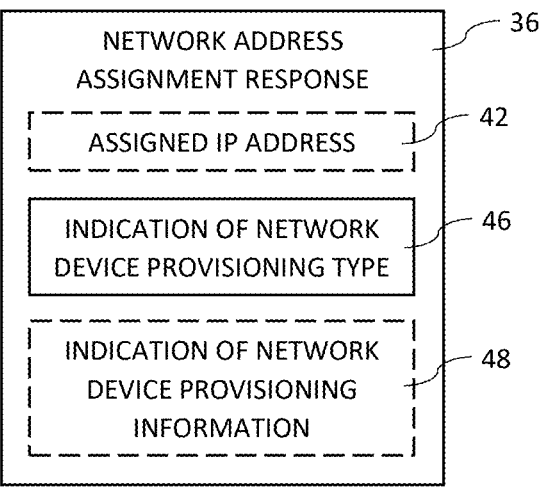
FIG. 5 is a diagram of illustrative types of information contained in a network address assignment response in accordance with some embodiments.

As shown in FIG. 5, some illustrative types of network address assignment responses 36 (e.g., stateful network address assignment responses 36) may include an IP address 42 (e.g., an IPv4 or IPv6 address) assigned to network device 10 and usable to configure the interface 30 on which message 36 is received. For some other types of responses 36 (e.g., stateless network address assignment responses 36), IP address 42 may be absent from response 36.

Illustrative network address assignment responses 36 (e.g., a stateful response 36 and/or a stateless response 36) may each include an indication 46 of network device provisioning type to be performed when that response 36 is processed by processing circuitry 24 to attempt device provisioning. As examples, indication 46 may be an indication that message 36, when processed by processing circuitry 24, facilitates device provisioning in compliance with non-secure provisioning protocol(s) (e.g., a (non-secure) zero touch provisioning (ZTP) protocol in compliance with one or more Requests for Comments (RFCs) such as RFC 2131, RFC 2132, RFC 8415, etc., a non-standardized or proprietary ZTP protocol, etc.), or may be an indication that message 36, when processed by processing circuitry 24, facilitates device provisioning in compliance with secure provisioning protocol(s) (e.g., a secure zero touch provisioning (SZTP) protocol in compliance with one or more RFCs such as RFC 8572, RFC 8415, etc., a non-standardized or proprietary SZTP protocol such as the Bootz protocol, etc.).

Secure provisioning protocols may specify operations (to be performed by processing circuitry 24) by which the ownership of network device 10 is verified (e.g., by the manufacturer) to be a particular owner (i.e., the current owner deploying the network device) and by which the device configuration data and/or other provisioning information received by processing circuitry 24 during the device self-provisioning operation is determined to be authentic (e.g., is the original intended provisioning data deployed by the owner, is unadulterated, etc.), whereas operations (to be performed by processing circuitry 24) as specified by non-secure provisioning protocols may lack such verification and authentication mechanisms or corresponding guarantees.

Illustrative network address assignment responses 36 (e.g., a stateful response 36 and/or a stateless response 36) may each include an indication 48 of network device provisioning information. Indication 48 may generally indicate where on the network portion (from which response 36 is received) network device provisioning information is located. Accordingly, processing circuitry 24, when attempting to perform device provisioning using response 36, may access and/or obtain network device provisioning information using indication 48. The type of indication 48 may differ depending on the type of device provisioning indicated by indication 46. As examples, indication 48 may include a Universal Resource Locator (URL) of a file location (e.g., a file path of a file server) at which the network device provisioning information is located, may include one or more Universal Resource Identifiers (URIs) of bootstrap servers with which device 10 can communicate to obtain the network device provisioning information, or may include other types of identifiers or locators of network device provisioning information.

In some illustrative network configurations, one or more illustrative network address assignment messages 36 (e.g., a stateful response 36 and/or a stateless response 36) may lack any indication 48 of network device provisioning information. Accordingly, processing circuitry 24, when attempting to perform device provisioning using this type of response 36 (in which indication 48 is absent), may access and/or obtain network device provisioning information using one or more default sources maintained in memory circuitry 26.

As described in connection with FIG. 4, processing circuitry 24, when attempting device provisioning based on stored network address assignment responses 36, may select and process a (sub)set of the stored response(s) 36 based on device provisioning priority. In particular, processing circuitry 24 may select and process stored response(s) 36 of the first (highest) priority to perform device provisioning, may (if there are no stored responses 36 of highest priority) select and process response(s) 36 of the second priority to perform device provisioning, may (if there are no stored responses 36 of higher priority) select and process response(s) 36 of the third priority, may (if there are no stored responses 36 of higher priority) select and process response(s) 36 of the fourth priority, etc.

In illustrative configurations described herein as examples, response(s) 36 of different priorities may facilitate device provisioning in different manners. FIGS. 6-9 show illustrative examples of network device 10 (e.g., processing circuitry 24 thereof, when executing process 32) performing device provisioning based on different types of stored response(s) 36 (e.g., respectively corresponding to response(s) 36 having different priorities stored in memory portions 40-1, 40-2, 40-3, and 40-4 in FIG. 4). Responses 36-1, 36-2, 36-3, 36-4, and 36-5 as described herein may be illustrative examples (instances) of the types of responses 36 described in connection with FIG. 5.

Figure 6:
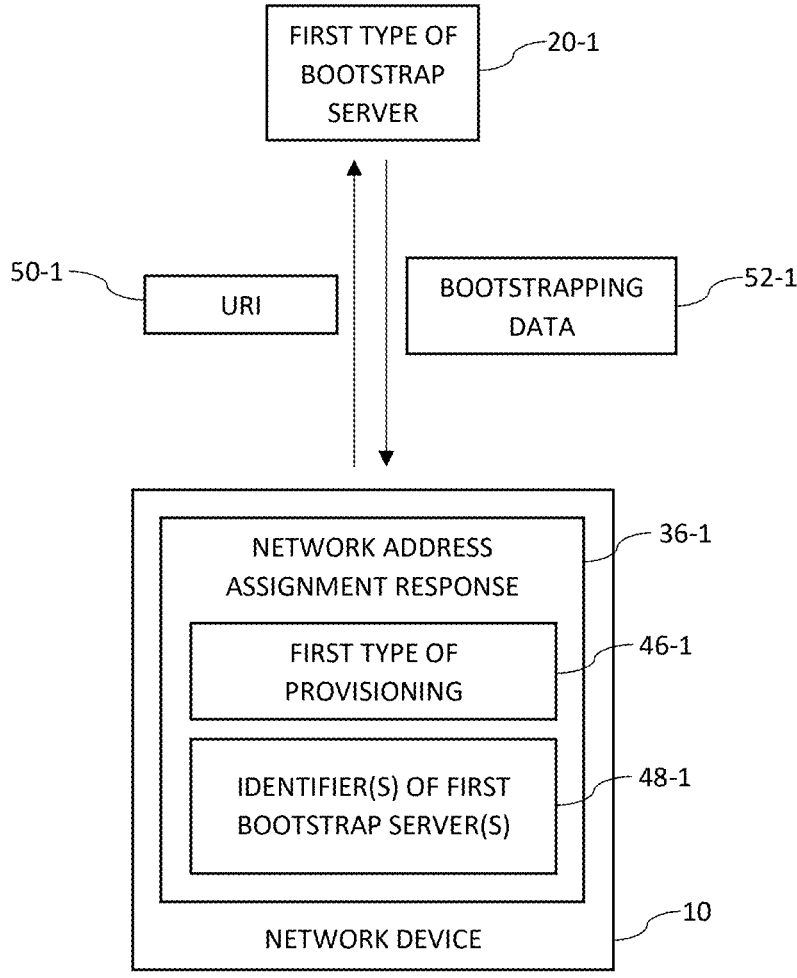
FIGS. 6-9 are diagrams of illustrative types of network address assignment responses containing information for facilitating provisioning of a network device in accordance with some embodiments.

In the example of FIG. 6, device 10 (e.g., processing circuitry 24 thereof) may attempt to perform device provisioning using a first type of stored network address assignment response 36-1 (e.g., response 36-1 of a first priority stored in memory portion 40-1 in FIG. 4). In particular, response 36-1 may include an indication 46-1 of a first type of network device provisioning (e.g., using a first type of device provisioning protocol, using a first type of SZTP protocol such as the Bootz protocol or another non-standardized or proprietary SZTP protocol, etc.) and may include one or more identifiers 48-1 (e.g., URIs) of bootstrap servers with which device 10 can communicate to perform device provisioning. The identified bootstrap server(s) may implement the first type of SZTP protocol (e.g., the Bootz protocol) matching indication 46-1. In the example of the first type of SZTP protocol being the Bootz protocol, identifiers 48-1 (e.g., URIs) may begin with "bootz://", which can serve as part of indication 46-1 that the Bootz protocol is being used.

Accordingly, processing circuitry 24 may access, using a URI 50-1 (e.g., one of the identifiers 48-1) and using the interface 30-1 on which response 36-1 is received, a first type of bootstrap server 20-1 implementing the first type of SZTP protocol. Based on communication with server 20-1 in accordance with the first type of SZTP protocol, processing circuitry 24 may obtain bootstrapping data 52-1 from bootstrap server 20-1. Processing circuitry 24 may process bootstrapping data 52-1 in accordance with the first type of SZTP protocol (e.g., by performing verification and authentication of bootstrapping data 52-1, by executing one or more scripts in bootstrapping data 52-1, by storing device configuration data obtained as part of bootstrapping data 52-1, etc.) to provision network device 10.

While not explicitly shown in the example of FIG. 6, any responses such as response 36-3 (FIG. 4) which are of the same type and priority as response 36-1 may be processed in a similar manner (e.g., using the first type of provisioning protocol, by communicating with a server implementing the first type of provisioning protocol to obtain bootstrapping data, by processing the obtained bootstrapping data, etc.) as described for response 36-1 in connection with FIG. 6. In such a manner, when device provisioning using a first response 36 (e.g., response 36-1) fails, processing circuitry 24 may attempt device provisioning using a second response 36 of the same type and priority (e.g., response 36-3), and so on, thereby iteratively attempting device provisioning based on the set of responses 36 having the same type and priority (e.g., the highest priority) one at a time, until device 10 has been successfully provisioned or until all responses in the set have been attempted.

Figure 7:
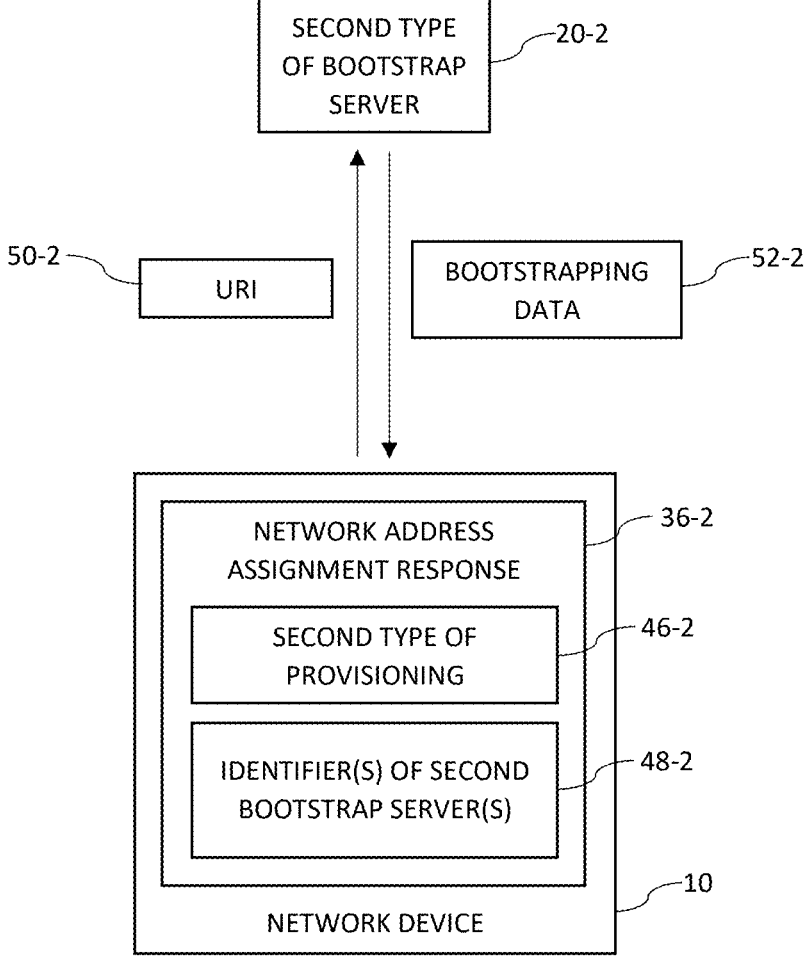

If there are no responses 36 received and stored by processing circuitry 24 for the first device provisioning priority (or if desired in some illustrative configurations, when device provisioning based on all responses of a higher device provisioning priority has failed), device 10 may attempt to perform device provisioning using a second type of stored network address assignment response 36 (e.g., responses 36 of a second device provisioning priority). In the example of FIG. 7, device 10 (e.g., processing circuitry 24 thereof) may attempt to perform device provisioning using stored network address assignment response 36-2 (e.g., response 36-2 of a second priority stored in memory portion 40-2 in FIG. 4). In particular, response 36-2 may include an indication 46-2 of a second type of network device provisioning (e.g., using a second type of device provisioning protocol, using a second type of SZTP protocol such as a standardized SZTP protocol in compliance with RFC 8572, etc.) and may include one or more identifiers 48-2 (e.g., URIs) of bootstrap servers with which device 10 can communicate to perform device provisioning. These identified bootstrap server(s) may implement the second type of SZTP protocol (e.g., the standardized SZTP protocol in compliance with RFC 8572) matching indication 46-2.

Accordingly, processing circuitry 24 may access, using a URI 50-2 (e.g., one of the identifiers 48-2) and using the interface 30-2 on which response 36-2 is received, a second type of bootstrap server 20-2 implementing the second type of SZTP protocol. Based on communication with server 20-2 in accordance with the second type of SZTP protocol, processing circuitry 24 may obtain bootstrapping data 52-2 from bootstrap server 20-2. Processing circuitry 24 may process bootstrapping data 52-2 in accordance with the second type of SZTP protocol (e.g., by performing verification and authentication of bootstrapping data 52-2, by executing one or more scripts in bootstrapping data 52-2, by storing device configuration data obtained as part of bootstrapping data 52-2, etc.) to provision network device 10.

While not explicitly shown in the example of FIG. 7, any responses which are of the same type and priority as response 36-2 may be processed in a similar manner (e.g., using the second type of provisioning protocol, by communicating with a server implementing the second type of provisioning protocol to obtain bootstrapping data, by processing the obtained bootstrapping data, etc.) as described for response 36-2 in connection with FIG. 7. In such a manner, when device provisioning using a first response 36 (e.g., response 36-2 in the example of FIG. 7) fails, processing circuitry 24 may attempt device provisioning using a second response 36 of the same type and priority, and so on, thereby iteratively attempting device provisioning based on the set of responses 36 having the same type and priority (e.g., the second highest priority) one at a time, until device 10 has been successfully provisioned or until all responses in the set have been attempted.

Figure 8:
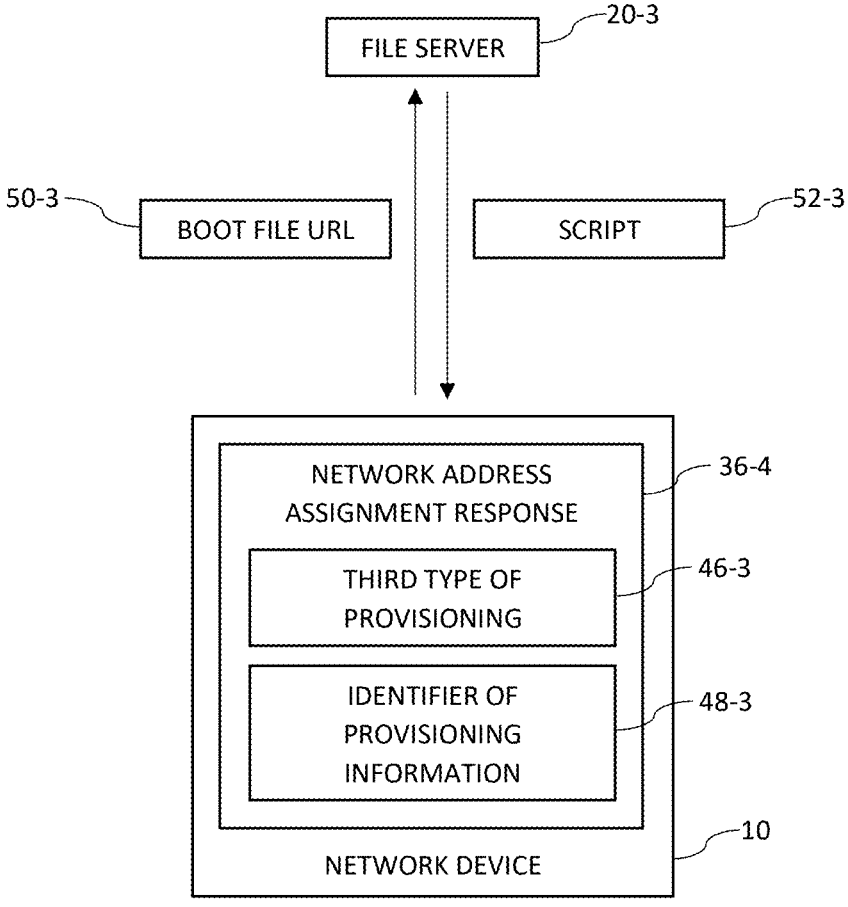

If there are no responses 36 received and stored by processing circuitry 24 for the first and second device provisioning priorities (or if desired in some illustrative configurations, when device provisioning based on all responses of all higher device provisioning priorities has failed), device 10 may attempt to perform device provisioning using a third type of stored network address assignment response 36 (e.g., responses 36 of a third device provisioning priority). In the example of FIG. 8, device 10 (e.g., processing circuitry 24 thereof) may attempt to perform device provisioning using stored network address assignment response 36-4 (e.g., a response of a third priority stored in memory portion 40-3 in FIG. 4). In particular, response 36-4 may include an indication 46-3 of a third type of network device provisioning (e.g., using a third type of device provisioning protocol, using a type of (non-secure) ZTP protocol such as a standardized or non-standardized ZTP protocol, etc.) and may include an identifier 48-3 of network device provisioning information (e.g., a boot file URL 50-3 identifying a file location at which an executable provisioning script is located).

Accordingly, processing circuitry 24 may access, using a URL 50-3 and using the interface 30 of device 10 on which response 36-4 is received, a file server 20-3. Based on communication with server 20-3, processing circuitry 24 may obtain a device provisioning script 52-3 from file server 20-3. Processing circuitry 24 may execute script 52-3 to provision network device 10.

While not explicitly shown in the example of FIG. 8, any responses which are of the same type and priority as response 36-4 may be processed in a similar manner (e.g., using the third type of provisioning protocol, by communicating with a file server to obtain a device provisioning script, by executing the device provisioning script, etc.) as described for response 36-4 in connection with FIG. 8. In such a manner, when device provisioning using a first response 36 (e.g., response 36-4) fails, processing circuitry 24 may attempt device provisioning using a second response 36 of the same type and priority, and so on, thereby iteratively attempting device provisioning based on the set of responses 36 having the same type and priority (e.g., the third highest priority) one at a time, until device 10 has been successfully provisioned or until all responses in the set have been attempted.

Figure 9:
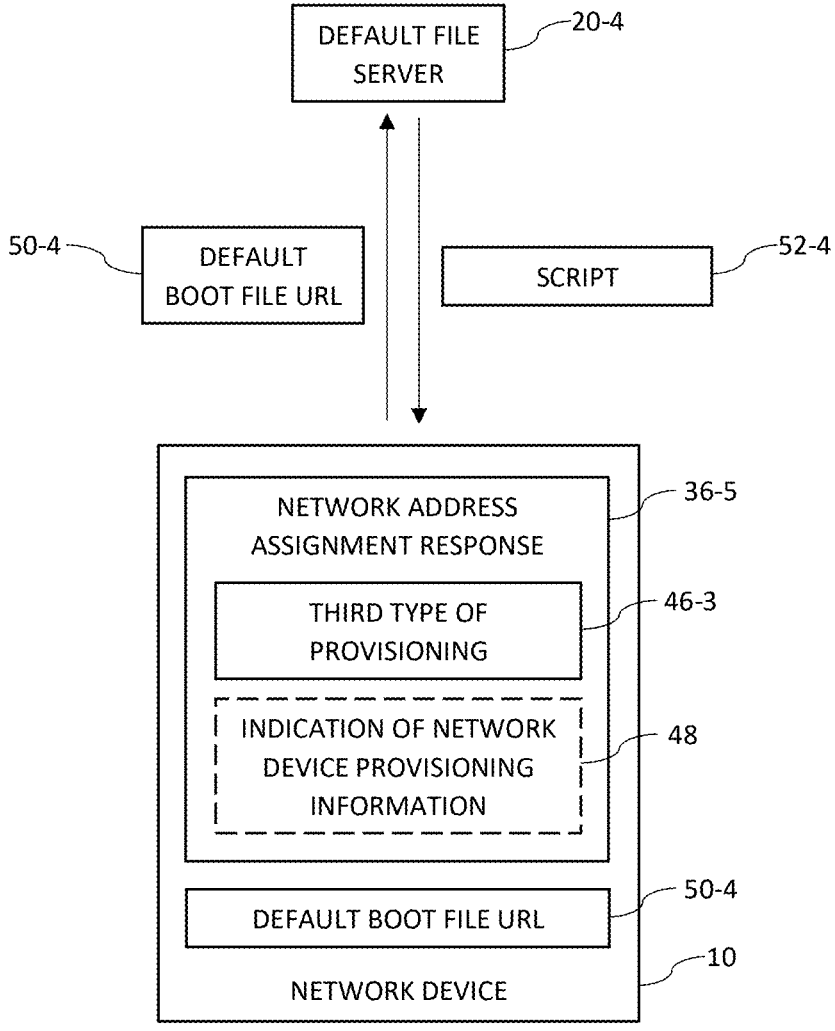

If there are no responses 36 received and stored by processing circuitry 24 for the first, second, and third device provisioning priorities (or if desired in some illustrative configurations, when device provisioning based on all responses of all higher device provisioning priorities has failed), device 10 may attempt to perform device provisioning using a fourth type of stored network address assignment response 36 (e.g., responses 36 of a fourth device provisioning priority). In the example of FIG. 9, device 10 (e.g., processing circuitry 24 thereof) may attempt to perform device provisioning using stored network address assignment response 36-5 (e.g., a response of a fourth priority stored in memory portion 40-4 in FIG. 4).

In particular, response 36-5 may include an indication 46-3 of a third type of network device provisioning (e.g., using the third type of device provisioning protocol, using a type of (non-secure) ZTP protocol such as a standardized or non-standardized ZTP protocol, etc.) that is the same as the type of network device provisioning indicated in response 36-4 (FIG. 8). However, unlike response 36-4, response 36-5 may lack an indication 48 of network device provisioning information (e.g., may lack a boot file URL 50-3 identifying a file location at which an executable provisioning script is located).

Accordingly, processing circuitry 24 may access, using a default boot file URL 50-4 (stored locally on memory circuitry 26 of device 10) and using the interface 30 of device 10 on which response 36-5 is received, a default file server 20-4. Based on communication with server 20-4, processing circuitry 24 may obtain a device provisioning script 52-4 from file server 20-4. Processing circuitry 24 may execute script 52-4 to provision network device 10.

While not explicitly shown in the example of FIG. 9, any responses which are of the same type and priority as response 36-5 may be processed in a similar manner (e.g., using the third type of provisioning protocol, by communicating with a default file server to obtain a device provisioning script, by executing the device provisioning script, etc.) as described for response 36-5 in connection with FIG. 9. In such a manner, when device provisioning using a first response 36 (e.g., response 36-5) fails, processing circuitry 24 may attempt device provisioning using a second response 36 of the same type and priority, and so on, thereby iteratively attempting device provisioning based on the set of responses 36 having the same type and priority (e.g., the fourth highest priority, the lower priority) one at a time, until device 10 has been successfully provisioned or until all responses in the set have been attempted.

Configurations described herein in which there are four types of priorities for network address assignment response messages 36 are merely illustrative. If desired, network address assignment response messages 36 may be organized (e.g., stored and/or processed) in any suitable number of priority groups and/or based on any other criteria (e.g., based on criteria other than those based on provisioning protocol type and type of provisioning information identifier as described in connection with FIGS. 5-9).

Figure 10:
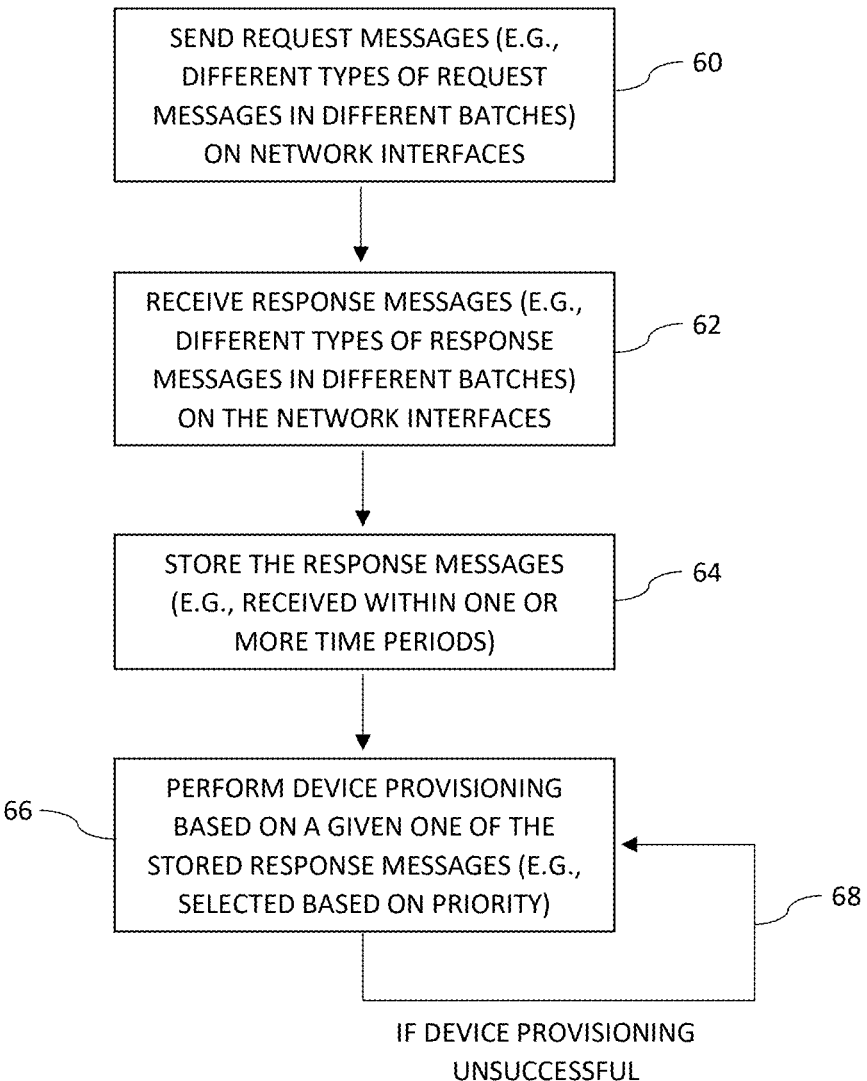
FIG. 10 is a flowchart of illustrative operations for performing network device provisioning based on multiple stored network address assignment responses in accordance with some embodiments.

FIG. 10 is a flowchart of illustrative operations for operating a network device (e.g., of the type(s) described in connection with FIGS. 1-9) to store (e.g., buffer) multiple network address assignment request messages to perform a device provisioning operation.

These operations may be performed at one or more processors of processing circuitry 24 in network device 10. The illustrative operations described in connection with FIG. 10 may generally be performed by processing circuitry 24 executing software instructions stored on memory circuitry 26. If desired, one or more operations described in connection with FIG. 10 may be performed by other dedicated hardware components in device 10. In an illustrative configuration described herein as an example, the operations described in connection with FIG. 10 may be performed by a device provisioning process 32 or generally by processing circuitry 24 on which process 32 and/or other software program instances are executed.

At block 60, processing circuitry on a network device (e.g., processing circuitry 24, when executing device provisioning process 32) may send network address assignment request messages (e.g., requests or request messages 34) on network interfaces (e.g., network interfaces 30). As an example, the processing circuitry may transmit, in a first batch, a first type of network address assignment request messages (e.g., a (stateful) DHCPv4 request message and a stateful DHCPv6 request message) on a plurality of network interfaces (e.g., all enabled network interfaces 30) and set a first timer for receiving response messages to the first type of network address assignment request messages. The processing circuitry may subsequently (e.g., after transmitting the first type of network address assignment request messages) transmit, in a second batch, a second type of network address assignment request message (e.g., a stateless DHCPv6 request message) on the plurality of network interfaces (e.g., all enabled network interfaces 30) and set a second timer for receiving response messages to the second type of network address assignment request message.

At block 62, the processing circuitry may receive network address assignment response messages (e.g., responses or response messages 36) on the network interfaces (e.g., network interfaces 30), with each response message being received on the same interface as the request message to which it responds. As an example, the processing circuitry may receive, in a first batch prior to the expiry of the first timer (e.g., within a first response solicitation time period), any network address assignment response messages to the first type of request messages (e.g., any (stateful) DHCPv4 response messages and any stateful DHCPv6 response messages). The processing circuitry may subsequently receive, in a second batch prior to the expiry of the second timer (e.g., within a second response solicitation time period after the first response solicitation time period), any network address assignment response messages to the second type of request message (e.g., any stateless DHCPv6 response messages).

If desired, the processing circuitry may perform the operations described in connection with blocks 60 and 62 by performing the operations described in connection with FIG. 3.

At block 64, the processing circuitry may store the received network address assignment response messages (e.g., on memory circuitry 26). As an example, these response messages may include response messages (e.g., any (stateful) DHCPv4 response messages and any stateful DHCPv6 response messages) received within the first response solicitation time period and may include response messages (e.g., any stateless DHCPv6 response messages) received within the second response solicitation time period.

These response messages may be associated with different device provisioning priority. Accordingly, if desired, the processing circuitry may perform the operations described in connection with block 64 by performing the operations described in connection with FIG. 4 to store response messages of different device provisioning priorities in different memory portions (e.g., in different buffers).

At block 66, the processing circuitry may perform (e.g., attempt) device provisioning based on a given one of the stored response messages. If desired, the given stored response message based on which device provisioning is performed at block 66 may be selected by the processing circuitry based on its device provisioning priority (e.g., in the manner described in connection with FIG. 4). Depending on the type of given response message being processed by the processing circuitry, the processing circuitry may perform device provisioning in a different manner. As examples, if the given stored response message is of the same type as response message 36-1 (FIG. 6), the processing circuitry may perform the operations described in connection with FIG. 6 at block 66; if the given stored response message is of the same type as response message 36-2 (FIG. 7), the processing circuitry may perform the operations described in connection with FIG. 7 at block 66; if the given stored response message is of the same type as response message 36-4 (FIG. 8), the processing circuitry may perform the operations described in connection with FIG. 8 at block 66; and if the given stored response message is of the same type as response message 36-5 (FIG. 9), the processing circuitry may perform the operations described in connection with FIG. 9 at block 66.

Device provisioning at block 66 may sometimes be unsuccessful. As examples, device provisioning based on a given response message may fail for a number of reasons, such as the given response message and/or address assignment server being misconfigured, the provisioning information server (e.g., server 20 on which provisioning information is provided) being identified in the response message not being reachable on the network interface that received the response message, the provisioning information and/or the provisioning information server being misconfigured, the network device failing to successfully complete execution or other processing of the provisioning information, etc.

If performing device provisioning based on the given response message is unsuccessful, processing may loop back via path 68 to block 66 but with another one of the stored response messages being used to perform (attempt) device provisioning. Configured in the manner described above, the processing circuitry may perform any number of iterations of the operations described in connection with block 66 for different stored response messages until device provisioning is successfully performed. As described in connection with FIG. 4, the different stored messages being used at block 66 may be selected by the processing circuitry based on their device provisioning priority and/or the order of reception (e.g., if there are multiple response messages of the same priority).

In some illustrative configurations described herein, the iterative attempts at device provisioning at block 66 via path(s) 68, when performed by the processing circuitry, may be confined to device provisioning attempts using one or more highest-priority-type response messages out of all stored messages (e.g., stored at block 64), with all other stored response messages not being processed at block 66 (e.g., being discarded after the one or more highest-priority-type response messages to be used are identified by the processing circuitry). If desired, in other configurations, the iterative attempts at device provisioning at block 66 via path(s) 68, when performed by the processing circuitry, may include device provisioning attempts using response messages of multiple priorities in the stored messages, e.g., attempted in order of priority.

The methods and operations described above in connection with FIGS. 1-10 may be performed by the components of one or more network devices and/or server or other host equipment using software, firmware, and/or hardware (e.g., dedicated circuitry or hardware). Software code for performing these operations may be stored on one or more non-transitory computer-readable storage media (e.g., tangible computer readable storage media) on one or more of the components of the network device(s) and/or server or other host equipment. The software code may sometimes be referred to as software, data, instructions, program instructions, or code. The one or more non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 24 in network device 10).

The foregoing is merely illustrative and various modifications can be made to the described embodiments. The foregoing embodiments may be implemented individually or in any combination.

What is claimed is:

1. A network device configured to perform device self-provisioning, the network device comprising:
   a plurality of network interfaces;
   memory circuitry; and
   processing circuitry coupled to the memory circuitry and the plurality of network interfaces and configured to:
      transmit, using each network interface in the plurality of network interfaces, a network address assignment request;
      receive, using at least some of the plurality of network interfaces, one or more network address assignment responses during a response solicitation time period;
      store the one or more received network address assignment responses on the memory circuitry; and
      perform, after the response solicitation time period, device provisioning based on a given network address assignment response in the one or more stored network address assignment responses.

2. The network device defined in claim 1, wherein the processing circuitry is configured to perform device provisioning based on an additional network address assignment response stored on the memory circuitry in response to device provisioning performed based on the given network address assignment response failing to successfully provision the network device.

3. The network device defined in claim 2, wherein the additional network address assignment response is part of the network address assignment responses received during the response solicitation time period.

4. The network device defined in claim 2, wherein the additional network address assignment response is not in the one or more network address assignment responses received during the response solicitation time period.

5. The network device defined in claim 1, wherein the network address assignment request comprises a stateful network address assignment request.

6. The network device defined in claim 5, wherein the stateful network address assignment request comprises a Dynamic Host Configuration Protocol (DHCP) version 4 (DHCPv4) request or a stateful DHCP version 6 (DHCPv6) request.

7. The network device defined in claim 1, wherein the processing circuitry is configured to transmit, using each network interface in the plurality of network interfaces, an additional network address assignment request and wherein the one or more network address assignment responses received during the response solicitation time period include a first network address assignment response to the network address assignment request and a second network address assignment response to the additional network address assignment request.

8. The network device defined in claim 1, wherein the processing circuitry is configured to:

transmit, using each network interface in the plurality of network interfaces, an additional network address assignment request;

receive, using at least some of the plurality of network interfaces, one or more additional network address assignment responses during an additional response solicitation time period; and store the one or more additional network address assignment responses on the memory circuitry.

9. The network device defined in claim 8, wherein the processing circuitry is configured to:

perform, after the additional response solicitation time period, device provisioning based on a given network address assignment response in the one or more additional stored network address assignment responses in response to device provisioning performed based on the given network address assignment response in the one or more stored network address assignment responses failing to successfully provision the network device.

10. The network device defined in claim 8, wherein device provisioning based on the given network address assignment response in the one or more stored network address assignment responses is performed after the additional response solicitation time period.

11. The network device defined in claim 8, wherein the network address assignment request comprises a stateful network address assignment request and wherein the additional network address assignment request comprises a stateless network address assignment request.

12. The network device defined in claim 1, wherein the processing circuitry is configured to perform device provisioning based on the given network address assignment response by performing operations in accordance with a zero touch provisioning protocol or a secure zero touch provisioning protocol.

13. A network device configured to perform device self-provisioning, the network device comprising:

a plurality of network interfaces;

memory circuitry; and processing circuitry coupled to the memory circuitry and the plurality of network interfaces and configured to:

transmit, using each network interface in the plurality of network interfaces, one or more network address assignment requests;

receive, using at least some of the plurality of network interfaces, a plurality of network address assignment responses;

store the plurality of network address assignment responses on the memory circuitry;

perform device provisioning using a first network address assignment response in the plurality of stored network address assignment responses; and in response to failing to successfully provision the network device based on the first network address assignment response, perform device provisioning using a second network address assignment response in the plurality of stored network address assignment responses.

14. The network device defined in claim 13, wherein the processing circuitry is configured to perform device provisioning using the first network address assignment response by performing operations in accordance with a secure zero touch provisioning protocol and wherein the processing circuitry is configured to perform device provisioning using the second network address assignment response by performing operations in accordance with the secure zero touch provisioning protocol.

15. The network device defined in claim 13, wherein the processing circuitry is configured to perform device provisioning using the first network address assignment response by performing operations in accordance with a non-secure zero touch provisioning protocol and wherein the processing circuitry is configured to perform device provisioning using the second network address assignment response by performing operations in accordance with the non-secure zero touch provisioning protocol.

16. The network device defined in claim 13, wherein the first and second network address assignment responses each lack an indication of device provisioning information, and wherein the processing circuitry is configured to perform device provisioning using the first and second network address assignment responses by accessing a default file location for device provisioning information.

17. The network device defined in claim 13, wherein the first network address assignment response is received by the processing circuitry prior to the second network address assignment response being received by the processing circuitry.

18. A network device configured to perform device self-provisioning, the network device comprising:

a plurality of network interfaces;

memory circuitry; and processing circuitry coupled to the memory circuitry and the plurality of network interfaces and configured to:

transmit, using each network interface in the plurality of network interfaces, a first network address assignment request;

receive a first network address assignment response in response to the first network address assignment request;

transmit, using each network interface in the plurality of network interfaces, a second network address assignment request after transmitting the first network address assignment request;

receive a second network address assignment response in response to the second network address assignment request;

perform, after receiving the first and second network address assignment responses, device provisioning using the first network address assignment response or using the second network address assignment response.

19. The network device defined in claim 18, wherein the processing circuitry is configured to store the first and second network address assignment responses on the memory circuitry prior to performing device provisioning using the first network address assignment response or using the second network address assignment response.

20. The network device defined in claim 18, wherein the processing circuitry is configured to perform device provisioning using the first network address assignment response based on the first network address assignment response having a higher priority than the second network address assignment response.

* * * * *